United States Patent [19]

Bingham

[11] Patent Number: 4,570,452
[45] Date of Patent: Feb. 18, 1986

[54] EARTH-TYPE HEAT EXCHANGER FOR HEAT PUMP SYSTEMS

[75] Inventor: Grady A. Bingham, Morehead City, N.C.

[73] Assignee: Thermal Concepts, Inc., Morehead City, N.C.

[21] Appl. No.: 728,232

[22] Filed: Apr. 29, 1985

Related U.S. Application Data

[60] Division of Ser. No. 421,143, Sep. 22, 1982, Pat. No. 4,516,629, which is a continuation-in-part of Ser. No. 365,992, Apr. 6, 1982, abandoned.

[51] Int. Cl.[4] .......................... F24J 3/02; F28F 13/14
[52] U.S. Cl. ....................... 62/260; 165/45; 165/146
[58] Field of Search ............... 62/260; 165/45, 146, 165/163

[56] References Cited

U.S. PATENT DOCUMENTS

| | | | |
|---|---|---|---|
| 1,091,369 | 3/1914 | Mejani | 165/163 |
| 1,867,975 | 7/1932 | Kilbourn et al. | 165/45 |
| 2,503,456 | 4/1950 | Smith | 62/115 |
| 2,513,373 | 7/1950 | Sporn et al. | 62/129 |
| 2,554,661 | 5/1951 | Clancy | 165/45 |
| 2,584,573 | 2/1952 | Gay | 165/45 |
| 2,749,724 | 6/1956 | Borgerd et al. | 62/129 |
| 2,780,415 | 2/1957 | Gay | 237/2 |
| 3,424,480 | 1/1969 | Holland | 285/111 |
| 3,648,767 | 3/1972 | Balch | 165/45 |
| 3,965,694 | 6/1976 | Vignal et al. | 62/260 |
| 4,042,012 | 8/1977 | Perry et al. | 165/45 |
| 4,091,636 | 5/1978 | Margen | 62/260 X |
| 4,106,555 | 8/1978 | Quintal | 165/45 |
| 4,205,718 | 6/1980 | Balch | 165/45 |
| 4,237,859 | 12/1980 | Goettl | 165/45 X |
| 4,255,936 | 3/1981 | Cochran | 165/45 X |
| 4,299,277 | 11/1981 | McGregor | 165/45 X |
| 4,313,491 | 2/1982 | Molitor | 165/163 X |

FOREIGN PATENT DOCUMENTS 2931485  2/1981  Fed. Rep. of Germany ........ 62/260

OTHER PUBLICATIONS

Ground Water Heat Pumps, National Water Well Association, Worthington, Ohio, 1978.
Heating by "Refrigeration"—The Heat Pump, book on Heating, pp. 119–120.
How a Heat Pump Works, book on Heating Systems, 1 unnumbered page.
Heating, book on Heating, Ventilating, and Air Conditioning, p. 715.
Heat Pump, book of Definitions, p. 80.
Heat and Heat Transfer, book on Heat Exchanger, 1 unmumbered page.

*Primary Examiner*—Sheldon J. Richter

[57] ABSTRACT

The heat exchanger unit is highly efficient in operation and is so constructed as to permit rapid installation in and removal from the earth at small size sites of desired use of the heat pump system. The unit includes a freon-conduction coil assembly preferably comprised of a plurality of concentric coils defining parallel flow paths for the fluid conducted to and from the heat exchanger unit during operation of the system. In one embodiment the coils are preferably formed of tubing of deffering diameters, and the convolutions of each coil are preferably spaced from one another and from the other coils of the assembly. The coil assembly may be enclosed by an impervious cylindrical casing to and from which antifreeze liquid may be readily conducted while he heat exchanger unit is situated entirely below ground level. Water supply means may be provided in association with the heat exchanger unit to maintain the soil adjacent thereto in a moist condition. In another embodiment there is no outer casing and water flows through an inner coil and exits along one side of the exchanger to provide a cooling effect on the outer freon carrying coil. Couplings of a fluid retentive and quickly connectable and disconnectable type releasably connect the heat exchanger unit to above-ground components of the heat pump system and one or more heat exchangers may be coupled to provide additional capacity as required.

7 Claims, 6 Drawing Figures

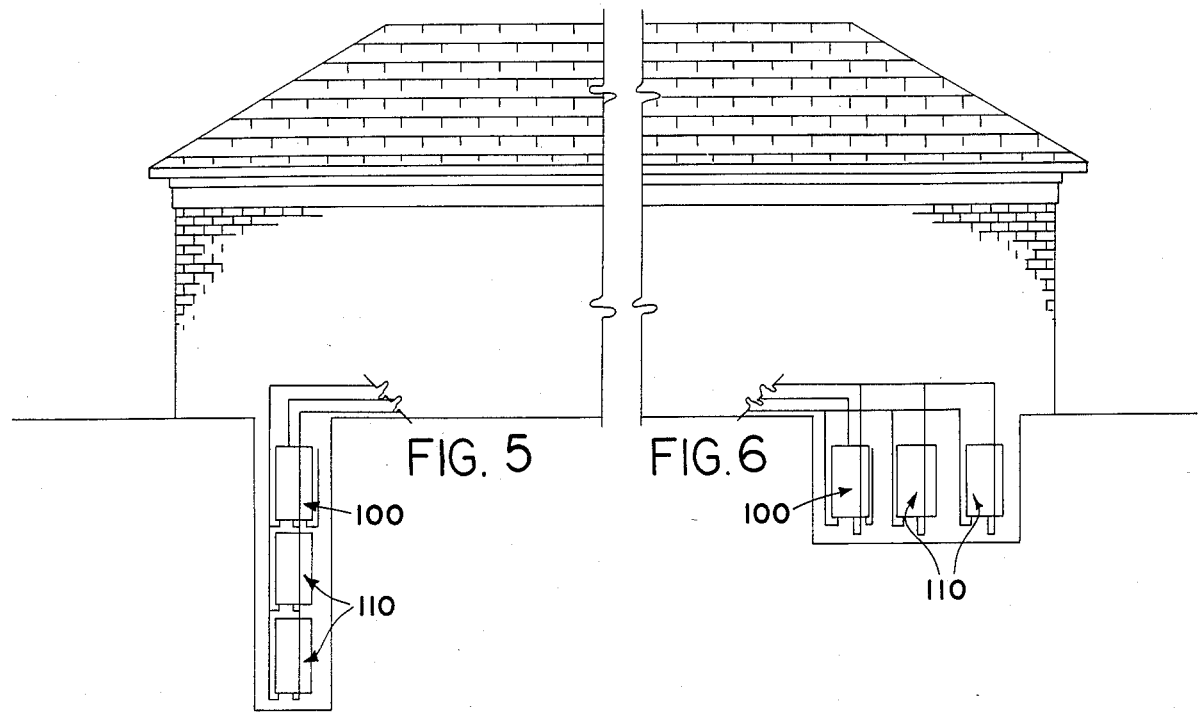
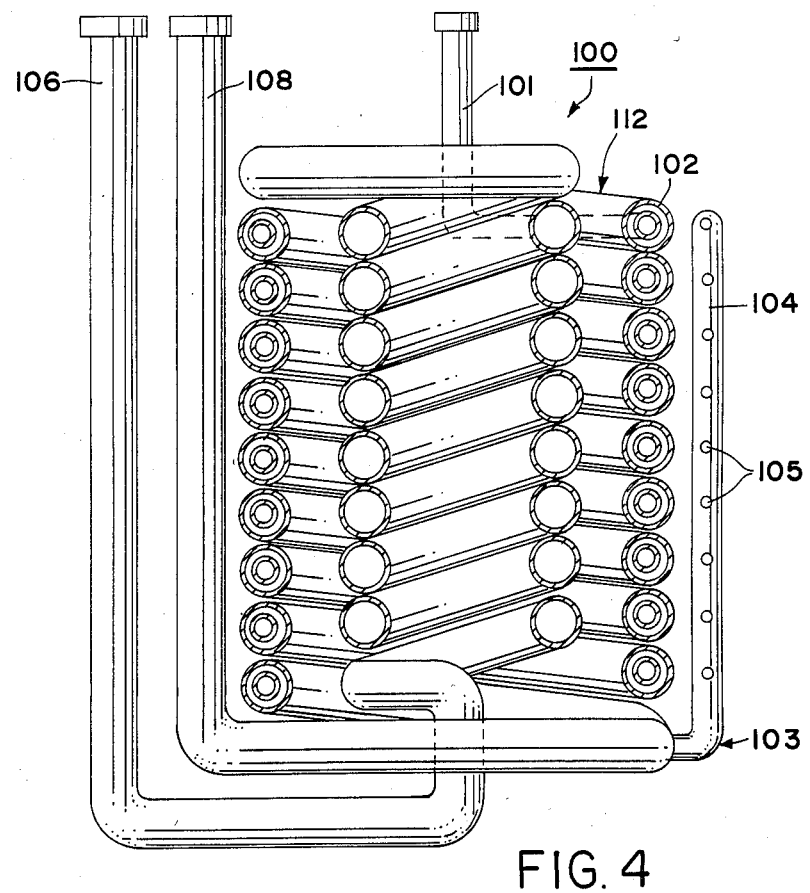

EARTH-TYPE HEAT EXCHANGER FOR HEAT PUMP SYSTEMS

This is a divisional application of pending patent application Ser. No. 421,143, filed Sept, 22, 1982, now U.S. Pat. No. 4,516,629, which was a continuation-in-part of application Ser. No. 365,992, filed Apr. 6, 1982, now abandoned.

This invention relates to heat pump systems having earth-type heat exchangers that are buried beneath ground level and that effect below-ground heat exchange between the surrounding soil or earth and the freon or similar fluid circulated through the systems. The invention more specifically relates to an improved heat pump system of the foregoing kind that is particularly, but not exclusively, adopted for heating and/or cooling a mobile home. Conventional homes, condominimums, office buildings, apartments, food markets, poultry plants and other permanent structures can also derive economic benefit from heat exchangers as shown herein.

BACKGROUND OF THE INVENTION

Many mobile homes are not as well insulated, from either the acoustic or thermal viewpoint, as are residential or commercial buildings of a more permanent nature. Due to their lack of adequate sound-suppressing insulation, in conjunction with the fact that many mobile homes are frequently situated in close proximity to one another in trailer parks or the like, objectionable noise is caused by a mobile home equiped with a heat pump having a conventional ambient air heat exchanger whose associated fan or blower runs whenever the system is in operation. Apart from and in addition to such noise problem, the lack of good thermal insulation in many mobile homes and the relatively poor efficiency of ambient-air heat exchangers make it quite expensive to heat and/or cool a mobile home with a heat pump system utilizing an ambient-air heat exchanger. In lieu of a heat exchanger or the ambient-air type within a mobile home pump system, the use of an earth type exchanger would be advantageous since exchangers of the latter type are usually more efficient and, when of a "pumpless" construction, are noiseless in operation. However, the high degree of heat-pump system efficiency required for economically feasible cooling and/or heating of a poorly insulated mobile home would not be realized by use in the systems of earth-type heat exchangers of many of the heretofore proposed constructions. Additionally, installation of most of the heretofore proposed earth-type heat exchangers is an expensive and time-consuming activity that requires the employment of skilled earth excavators and other workman, that may, and frequently does, require the availability of a considerable earth surface area, and that results in permanent placement of the exchanger within the earth. While a large expenditure and the use of considerable land in the permanent installation of an earth-type exchanger might be justified in the case of a heat pump system servicing a conventional building or other non-movable structure, the situation is markedly different with mobile homes. Mobile homes usually constitute a much smaller and shorter-term owner investment that conventional homes, and their heating and/or cooling systems must therefore be correspondingly lower in price to be economically justifiable. Mnay mobile homes are situated on small lots in mobile home "parks" or the like, where only a limited area of land is available for earth-type heat exchanger installation and use. Finally, since mobile homes are frequently moved to different sites, an earth-type heat exchanger for a heat pump system thereof must be not only rapidly and economically installable in a small amount of available land, but must also be readily removable from the earth and readily transportable to another location. However, with the rising energy prices permanent building structures can also benefit from the earth type heat exchanger as shown herein.

THE PRIOR ART

Prior U.S. patents of possible relevance to the present invention include the following: U.S. Pat Nos. 4,255,936, 4,299,277, 4,237,859, 4,205,718, 4,106,555, 4,091,636, 4,042,012, 3,965,694, 3,648,767, 2,749,724, 2,780,415, and 2,584,573.

SUMMARY OF THE INVENTION

The present invention provides an improved earth-type heat exchanger unit that, although also capable of advantageous utilization in heat pump systems servicing fixedly-constructed residential and commercial buildings or other structures, is particularly suited for the heating and/or cooling of mobile homes. The present exchanger unit, which alternately acts as an evaporator/condenser for the system's freon-type of fluid during heating/cooling operation of the system, renders the latter highly efficient during either mode of operation. The exchanger unit is of compact and inexpensive construction, and may be quickly and economically installed in the earth at locations, such as trailer parks or shopping centers, where only a limited area of ground is available for use. The exchanger unit is noiseless in operation since it includes neither the fan nor blower associated with ambient-air heat exchangers nor pumps such as are associated with some previously-proposed earth-type heat exchangers. The exchanger unit may be readily removed from the earth and transported to another location for re-installation, when desired, without loss of the freon-type fluid from the system. One or more exchanger units may be coupled to provide capacity for a particular installation.

The heat exchanger unit of the present invention has been found to reduce the head pressure of the compressor used herewith and thus by lowering the workload on the compressor provides additional savings by lowering the maintenance and repair costs. Savings can also be realized by eliminating the need for "heat strips" or other electrical resistance elements which may be used in mobile homes and with the elimination of the heat strips insurance rates can be lowered for additional savings to the owner or user.

Certain embodiments of the present invention may be used for providing heating for poultry houses or the like whereby the heat exchanger can be placed in suitably constructed pits of animal excrement having heat producing capabilities.

In a hereinafter described preferred embodiment thereof, the heat exchanger unit includes a generally cylindrical coil assembly capable of being readily inserted into and removed from the lower end portions of a small diameter vertical bore or hole such as can be quickly formed in the earth by use of a conventional auger or the like. The coil assembly comprises a plurality of concentric coils that preferably are arranged in parallel-flow, versus series-flow, relationship to each other. During operation of the system freon-type fluid is conducted to and from the coil assembly by conduits that extend upwardly therefrom to above-ground connections, of a readily releasable and fluid-rententive type, with above-ground system conduits. All of the coils of the assembly are formed of copper, cupernickel or similar tubing having good thermal conductivity and corrosion resistance and, to achieve optimum balance of the system, the tubing of each coil preferably is of a different diameter from that of each other coil.

When the heat pump system with which the preferred exchanger unit is associated is of a type in which "icing" of the coil assembly might occur during system operation, the exchanger preferably further includes an impervious cylindrical copper casing surrounding the coil assembly and adapted to be filled with ethylene glycol or a comparable anti-freeze liquid, together with pipe means fixedly connected to and communicating at its lower end with the casing and extending upwardly therefrom to an upper portion disposed above ground level and provided with a removable cover or cap. The aforesaid pipe means permits the anti-freeze liquid to be easily introduced into and removed from the casing while it is disposed completely below ground level.

In an alternative or optional embodiment means are provided in association with the heat exchanger unit for, at timed intervals, conducting water from any suitable above-ground source to a location immediately adjacent the underground unit and there discharging such water into the adjacent earth for the purpose of maintaining such earth in a moist condition.

DESCRIPTION OF THE DRAWINGS

Other features and benefits of the invention will be apparent from the following description of illustrative embodiments thereof, which should be read in conjunction with the accompanying drawings, in which:

FIG. 4 is a cross-sectional view of another embodiment of the heat exchanger unit;

FIG. 5 demonstrates a plurality of exchanger units placed in vertical fashion; and FIG. 6 demonstrates a plurality of heat exchanger units placed in horizontal configuration.

DESCRIPTION OF THE PREFERRED EMBODIMENTS

Figure 1:
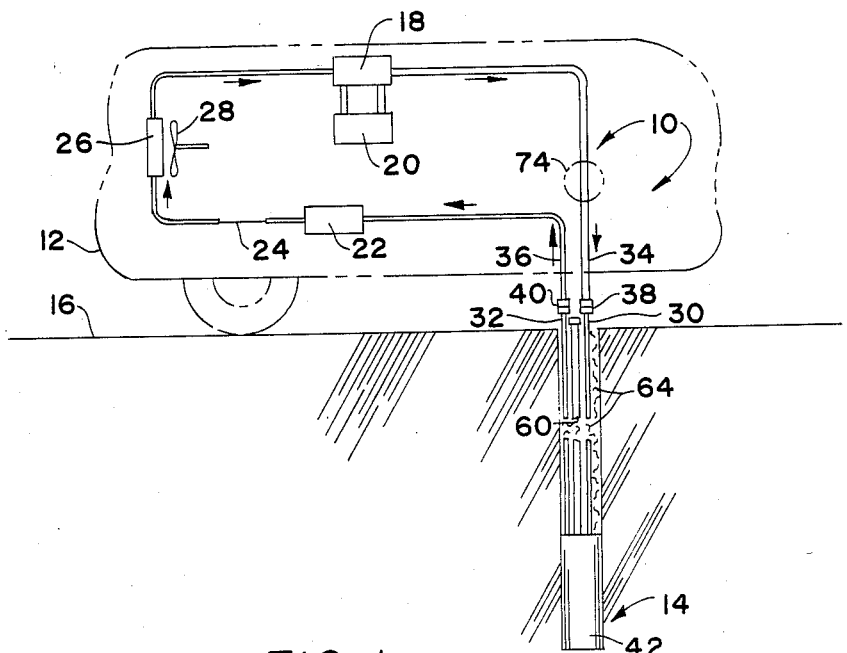
FIG. 1 is a partially diagramatic view of a heat pump system associated with a mobile home, the latter being fragmentarily shown by phantom lines, having an earth-type heat exchanger unit and associated components in accordance with the invention.

Referring more particularly to the drawings, the numeral 10 in FIG. 1 designates a reversible heat pump system associated with and adapted for the cooling and/or heating of a mobile home structure 12 fragmentarily shown by phantom lines. System 10 includes an earth-type heat exchanger unit 14 that is disposed during the system's use at a depth, which in most locales will be nine to fifteen feet below ground level 16, where the surrounding earth or soil has a substantially constant year-round temperature of approximately fifty degrees. System 10 also has a number of conventional above-ground components that are carried by mobile home 12. These include a reversing valve 18, a compressor 20, a dryer-filter unit 22 for removing moisture and/or extraneous solid material from the freon or similar fluid conducted through the system during operation thereof, a capillary tube 24, and a structure heat exchanger 26 with which a fan or blower 28 may be and illustratively is associated. System 10 also includes suitable electrical controls (Not shown) and suitable conduits that interconnect all of the foregoing components and therewith define a closed circuit through which the freon-type fluid is conducted during operation of the system. The aforesaid conduit means includes vertically extending elongate conduits 32, 34 whose lower ends are connected to and communicate with earth-type heat exchanger unit 14 and whose upper ends, which are disposed slightly above ground level 16, are respectively releasably connected to above-ground system conduits 34, 36 by couplings 38, 40. Such couplings are of the type that are readily connectable and disconnectable and, when disconnected, are self-sealing so as to then prevent escape of the freon-type fluid from any of the conduits 30, 32, 34, 36 with which the same are associated. Couplings of the aforesaid type are commercially available from various sources, and are marketed by one supplier under the trademark AEROCUIP.

The arrows shown in FIG. 1 indicate the direction of flow of the freon-type fluid through system 10 when the same is used for cooling of the mobile home 12 or other above-ground structure with which the system is associated. As is well known to those skilled in the art, at such time earth-type heat exchanger unit 14 functions as a condenser of the freon-type fluid conducted to and through it, while structure heat exchanger 26 functions as an evaporator of such fluid. During heating operation of system 10 the flow of fluid through the system and the functions of exchangers 14, 26 are reversed; i.e., exchanger unit 14 then functions as an evaporator and exchanger 26 as a condenser.

Figure 3:
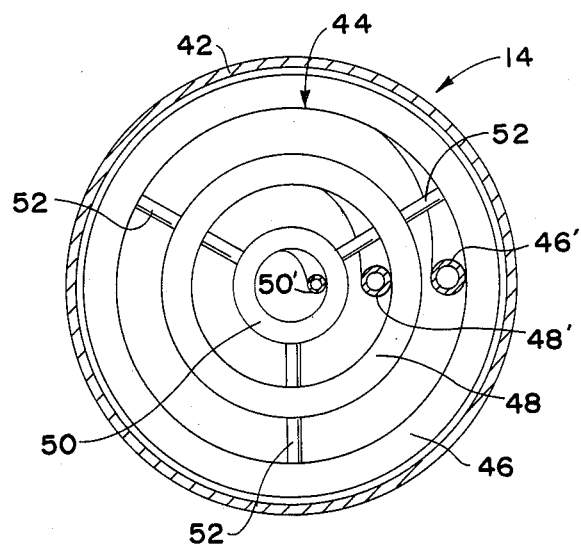
FIG. 3 is a horizontal sectional view taken approximately along the lines and in the direction of the arrows 3–5 of FIG. 2 through the heat exchanger unit.
Figure 2:
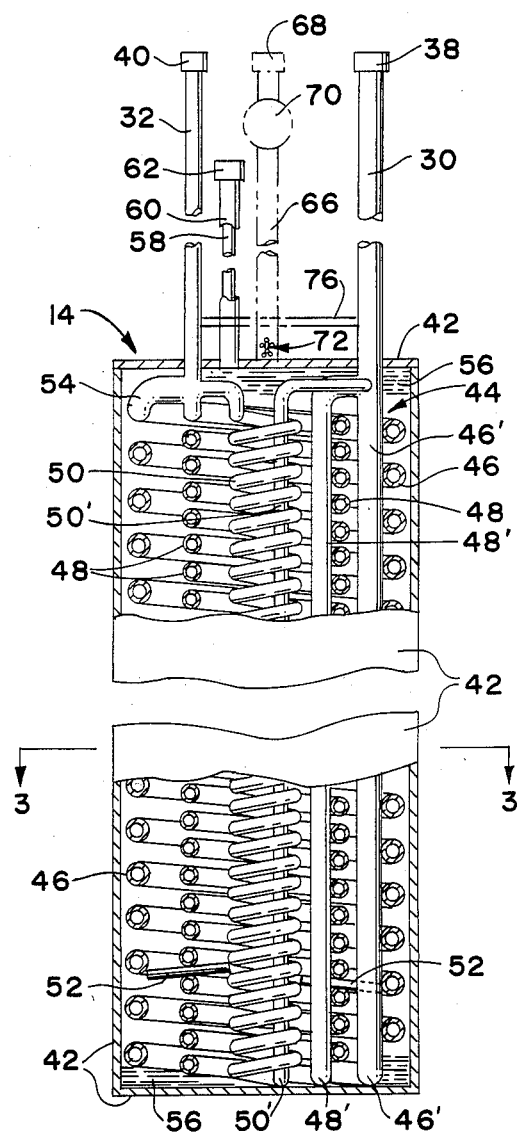
FIG. 2 is an enlarged view, primarily in vertical section but with some components being shown in front elevation, of the earth-type heat exchanger unit, the unit and various conduits and pipe members associated therewith being broken away intermediate their heights.

Referring now also to FIGS. 2 and 3, as well as to FIG. 1, of the drawings, in one embodiment thereof earth-type heat exchanger unit 14 comprises a vertically extending impervious cylindrical casing 42 and a coil assembly 44 that is disposed within and extends substantially the entire height of casing 42. Both casing 42 and coil assembly 44 are formed of copper or equivalent material possessing comparable characteristics of strength, thermal conductivity and corrosion resistance. Assembly 44 preferably and illustratively consists of a plurality of cylindrical tubular coils 46, 48, 50 that extend in concentric relationship to each other about the vertical central axis of casing 42. Coils 46, 48, 50 are spaced from each other and the outermost coil 46 is spaced from the inner cylindrical surface of casing 42. The adjacent convolutions of each coil 46, 48, 50 are spaced vertically from each other, and the lowermost convolution of each coil engages and may be soldered or otherwise suitably affixed to the bottom of casing 42. Intermediate the height thereof, coils 46, 48, 50 may be externally connected to each other by one or more spider-like braces such as that designated in FIGS. 2 and 3 by the numeral 52. Assembly 44 further includes vertical tubes 46', 48', 50' that are associated with respective ones of the coils 46, 48, 50. Each such tube communicates at its lower end with the lowermost convolution of the coil with which it is associated and, at spaced points along its length, engages and is soldered or otherwise fixedly connected to each other convolution of such coil. The upper ends of tubes 46', 48', 50' each communicate, either directly (as in the case of tube 46') or through angularly-extending extensions integral therewith (as in the case of tubes of 48', 50'), with the previously mentioned conduit 30 which, along with conduit 32, is fixedly connected to unit 14 and extends vertically upwardly therefrom. The lower end of the latter conduit 32 in turn communicates, via a suitable three-branch fitting 54, directly with the uppermost convolution of each coil 46, 48, 50. It will be apparent that the freon or similar fluid circulated to and from unit 14 during operation of system 10 is conducted through such unit along three parallel and mutually independent flow paths each defined by a respective one of the coils 46, 48, 50 and its associated vertical tube 46', 48', 50'. Thus, when system 10 is used for cooling purposes and the fluid flow is in the direction of the arrows of FIG. 1, a first part of the fluid then conducted to unit 14 through conduit 30 passes along a first flow path defined by tube 46' and outer coil 46, while a second part of such fluid passes along a second flow path defined by tube 48' and intermediate coil 48, and a third part of such fluid passes along a third flow path defined by vertical tube 50' and innermost coil 50. The flow along each such path is parallel to but independent of the flows along the other paths and is first downwardly through the vertical tube and then upwardly through the cylindrical coil of such path. The three independent flow paths combine at the fitting 54 of the conduit 36 through which the fluid is conducted, during cooling operation of system 10, upwardly from unit 14 to the above-ground system components. When system 10 is used for heating rather than for cooling purposes, and the flow of freon or similar fluid is reversed, the fluid then entering unit 14 through conduit 32 is of course still caused to pass along three independent parallel flow paths each defined by one of the coils 46, 48, 50 and the therewith-associated one of the tubes 46', 48', 50', the only difference being that the fluid conducted along each path passes first downwardly through the coil and then upwardly through the tube thereof.

While coils 46, 48, 50 could be connected in series with one another, rather than in parallel, the parallel-flow arrangement is preferable in that it greatly increases the efficiency of unit 14. By its utilization of parallel flow paths, unit 14 achieves an efficiency approaching that which would be realized by three separate heat exchanger coils buried at laterally distal locations from each other, while retaining its desired attributes of space conservation and economy and ease of installation, removal and transport.

In a conventional heat pump system the conduits 34, 36 (FIG. 1) normally have different diameters, these usually being $\frac{5}{8}''$ and $\frac{3}{8}''$, respectively. Conduit 30 and the tubing of which outer coil 46 and its associated tube 46' are formed preferably and illustratively have approximately the same $\frac{5}{8}''$ diameter as conduit 34. Conduit 32 and the tubing of which innermost coil 50 and its associated tube 50' are formed preferably and illustratively have approximately the same $\frac{3}{8}''$ diameter as conduit 36. The tubing of which intermediate coil 48 and its associated tube 48' are formed preferably and illustratively have the intermediate diameter of approximately $\frac{1}{2}''$. The volume of the fluid conducted through the flow path defined by coil 46 and tube 46' will therefore be greater than that conducted through the parallel flow path defined by coil 48 and tube 48', which in turn will be greater than that through the flow path defined by coil 50 and tube 50'. This is desirable since it tends to compensate for any differences in the rates of heat exchange that might exist between the three flow paths due to the respective coils and tubes defining such paths being laterally spaced different distances from the cylindrical wall of the casing 42 and from the soil or earth encircling such casing wall. Additionally, if the tubing of each coil and tube of assembly 44 were of the same large diameter as that of outer coil 46 and tube 46', the efficiency of unit 14 might then be so great as to under certain conditions cause the unit to over-condense the fluid conducted therethrough during cooling operation of system 10, resulting in fluid feedback to and "slugging" of compressor 20. The possibility of this highly undesirable result, which can cause "knocking" and eventual failure of the compressor, is avoided, and better overall balance of the system is achieved, by forming the three parallel flow paths of unit 14 of tubing of differing diameters.

When a system 10 of the previously described construction is employed for heating purposes, at which time unit 14 functions as a fluid evaporater rather than as a fluid condenser, there may be a tendency for ice or or "frost" to form upon portions of its coil assembly 44. To prevent such icing and the loss in efficiency that would result from it, casing 42 of unit 14 is adapted to be completely filled during use of system 10 with a suitable anti-freeze liquid, designated in FIG. 2 of the drawings by the numeral 56, such as ethylene glycol. To permit such liquid to be introduced into and also removed from casing 42 while unit 14 is disposed in its underground "use" position of FIG. 1, pipe means in the form of interconnected inner and outer spaced pipes 58, 60 extend through and are fixedly connected to the top of casing 42. Pipes 58, 60 extend vertically upwardly from casing 42 and the above-ground upper ends thereof are normally closed by a removable cap 62. Introduction of anti-freeze liquid 56 into casing 42, after the casing has been placed in its FIG. 1 below-ground position and location of intended use, is readily achieved by removing cap 62 and pouring liquid into inner pipe 58 until casing 42 has been completely filled. During the filling operation the air within casing 42 is vented freely therefrom through the space between inner pipe 58 and outer pipe 60, thus permitting the casing to be completely filled with liquid 56 without the presence of an undesirable air pocket adjacent its upper end. After filling of casing 42 with liquid 56, and during use of system 10, cap 62 prevents entry of dust or other debris into the casing and pipes 58, 60 accommodate any expansion of liquid 56 that might occur due to changes in its temperature. At such time as movement of mobile home 12 and unit 14 to a different location are contemplated, liquid 56 may and should be removed from casing 42 while unit 14 still occupies its FIG. 1 underground location. Such removal is effected by again removing cap 62, feeding a flexible tube or the like (not shown) downwardly through inner pipe 58 and casing 42 until its lower end engages the bottom of the casing, and then pumping liquid 56 upwardly through the tube by means of a pump, (not shown, but which may be of the simple and economical type used for small-boat bilge-pumping purposes) until all of the liquid is removed from casing 42.

Although unit 14 is of a highly compact construction and relatively small size, illustratively having a diameter of only approximately eight inches and a height of approximately only three feet, it will be appreciated that a considerable quantity and therefore weight of anti-freeze liquid 56 is required to completely fill the unit's casing 42. The fact that such liquid can be introduced into and removed from casing 42 while unit 14 is disposed at its below-ground position of use (FIG. 1) significantly facilitates the unit's installation at and, when desired, removal from different desired sites of use of system 10. Thus, when it is desired to install unit 14 in a mobile-home park or the like to which mobile home 12 has been moved, the only excavation required to the boring of a vertical hole in the ground of the desired depth and of a diameter sufficient to receive and accommodate the relatively small diameter casing 42 of the unit. When a power auger is employed for the foregoing purpose, such hole can be formed in the matter of minutes. After formation of the hole, unit 14 is inserted into and lowered to the bottom of it. After the top of unit 14 itself has passed below ground level, controlled lowering of the unit to the bottom of the hole is readily achieved by a person grasping the conduits 30, 32 and/or the pipe 60 extending upwardly from the unit. Insertion of the unit in the foregoing manner can be easily accomplished by a single person since at such time casing 42 does not contain the anti-freeze liquid 56, and the combined weight of its structural components and of the freon-type fluid that it does then contain is no more than approximately twenty pounds. After unit 14 has been lowered to the bottom of the hole, conduits 30, 32 are respectively connected to conduits 34, 36 (FIG. 1) by the associated quick-connect couplings 38, 40, and anti-freeze liquid 56 is introduced into the upper end of pipe 58 until casing 42 has been completely filled with such liquid. If the earth-hole is of appreciably larger diameter than casing 42 of unit 14, sufficient soil is then re-introduced into the hole to insure that the casing's exterior cylindrical surface, as well as its bottom surface, is in good heat-exchange engagement and relationship with the thereto adjacent earth. This result can be achieved even if the soil is particularly dry or clay-like by simultaneously introducing water into the hole and thus forming a flowable slurry or mud within the lower portion of the hole. Completion of all the foregoing matters can be readily accomplished in less than an hour's time and renders system 10 operable in all respects. While that portion of the ground hole above unit 14 can if desired also be partially or completely filled with soil, this is neither necessary nor desirable. Preferably that portion of the ground hole above unit 14 is filled with light-weight thermal insulating material such as that designated by the numeral 64 in FIG. 1. In addition to minimizing undesired heat transfer to and/or from the conduits 30, 32 extending upwardly from unit 14 through such ground-hole portion, the use of light weight thermal insulating material 64 within such ground-hole portion facilitates subsequent removal of the unit, when desired, from the ground hole. In the latter regard, such removal is accomplished by essentially a reversal of the above-described installation steps except that, of course, the earth-moving step consists of re-filling, rather than digging, the ground hole after removal of unit 14 therefrom. The overall length and weight of the removed unit 14 and the conduits 34, 36 and pipes 58, 60 fixed to it are such that the same can be readily temporarily secured by straps or the like (not shown) upon the top or sides of mobile home 12 during movement of the latter to another desired site.

Various modifications and/or alternative embodiments of the invention, to be now described, are possible. Under certain climatic conditions of use, the soil surrounding the cylindrical outer surface of casing 42 of the buried unit 14 may tend to shrink away from the casing. If this undesirable condition should occur, it of course can be eliminated by manually pouring water into the ground hole and thus again forming a flowable slurry or mud that will re-establish a good heat-exchange relationship between the exterior of the casing and the surrounding soil. The same result can be achieved automatically, if desired, by the provision of a water-conducting pipe 66, shown by phantom lines in FIG. 2 of the drawings, in association with unit 14. Pipe 66 has a perforate lower end portion that abuts and is fixedly secured to the center of the upper surface of the top of casing 42. At its upper end portion, which is disposed above ground level, pipe 66 is provided with a coupling 68 adapted to be connected to a conventional water source such as a garden hose, and is also provided with a mechanically or electrically-driven timer and valve assembly effective at pre-set desired intervals to permit water to flow downwardly through pipe 66 and from the radially extending perforations 72 within its lower end portion. Such water flows across the top of casing 42, and thence downwardly along its cylindrical exterior surface to moisten the adjacent soil and thus form it into the desired flowable slurry or mud.

System 10 may include or be provided with an evaporator pressure regulator 74, such as indicated by phantom lines in FIG. 1, in association with its above-ground conduit 34 through which the freon or similar fluid is conducted from unit 14 when system 10 is employed for heating purposes and the unit is then functioning as a fluid evaporator. By maintaining a substantially constant fluid pressure of suitable magnitude (e.g., 60 psi), regulator 74 prevents the previously discussed problem of possible icing of portions of coil assembly 44 and thus eliminates the need for anti-freeze liquid 56, casing 42 and pipes 58, 60. Therefore, when system 10 includes regulator 74 or some comparable means for otherwise obviating the icing problem, unit 14 may consist essentially of only coil assembly 44. In such instance, however, one or more spider-like braces, such as that shown by phantom lines and designated by the numeral 76 in FIG. 2, preferably are provided in association with conduits 30, 32 and, if employed, water supply pipe 66, to better secure and/or maintain the same in their illustrated relationships to one another. Apart from the fact that no anti-freeze liquid is employed, the major difference in the manner of installing and removing the casingless unit 14 is that, after the unit is lowered into the bottom of the ground hole, sufficiently flowable soil or earth is introduced into the ground hole as to cause the soil to fully surround all surface portions of coil assembly 44; and during subsequent removal of unit 14, sufficient water is introduced into the ground hole to permit unit 14 to be raised upwardly without the imposition of undue stress upon assembly 44 or conduits 30, 32.

The embodiment of heat exchanger 100 as shown in FIG. 4 provides a casingless unit utilizing no anti-freeze whereby water directed through inlet conduit 101 and along an inner flow path through heat exchanger 100 inside of conduit 102. Conduit 102 forms an outer coil 112 having an inner water flow path and an outer freon-type fluid flow path. Conduit 101 exits conduit 102 at the lower end of exchanger 100 whereby elbow bend 103 directs water flowing there-through vertically upwardly through water relief conduit 104. Water relief conduit 104 comprises a series of apertures 105 for releasing water against the outer coil 112. As would be understood water would be directed through apertures 105 when exchanger 100 is being used during the cooling cycle in a house or other structure. For example, a pressure activated valve (not shown) would be joined to conduit 101 and activated by a pressure line joined onto the high pressure side of the compressor. When, for example, the compressor develops a pressure of 240 psi the pressure relief valve would be opened to allow water to flow through conduit 101 along the inner flow path of conduit 102 upwardly through relief conduit 104 and out apertures 105 to cool exchanger 100.

As would be understood during the cooling cycle a freon-type fluid is directed through conduit 106 where it flows first upwardly through internal coil 107 and then downwardly along the outer flow path of conduit 102. After being sufficiently cooled the freon type fluid is then directed back to the above-ground components of heat pump system through fluid-return conduit 108. As would be understood during the heating cycle the freon-type fluid would flow in the reverse direction and water would not be necessary to cool outer coil 112 of exchanger 100.

FIGS. 5 and 6 demonstrate a series of heat exchangers such as generally shown in FIG. 4. However, exchangers 110 in both FIGS. 5 and 6 do not have the water conduit 104 since it is believed that exchanger 100 will furnish sufficient water for all the units with an additional freon capacity provided by heat exchangers 110. The addition of more exchangers can be made as required and the addition of standard sized units can facilitate manufacturing procedures.

Studies of soil temperatures demonstrate that said temperatures change slowly between depths of about 2 to 30 feet and in the central and eastern states, where the soil is moist, the mean annual soil temperature (MAST) at depths greater than 30 feet generally remains constant at approximately 1° C. higher than the mean annual air temperature (MAAT). Soil temperatures vary above depths of about 30 feet and they are affected by soil moisture content, climatic conditions including air movement near the ground, clouds, rain, covers such as grasses and trees, and ground-water circulation.

In states such as North Carolina because of the humid climatic conditions, the average mean annual soil temperature can be closely estimated from the MAAT and will closely approximate the MAST at depths below about 6 feet. Therefore, across North Carolina the MAST at depths of 6 feet or greater, generally range from the low 50's to the mid 60's° F.

Test results demonstrate from actual installations of exchangers 100 in egg coolers, mobile homes, office buildings, and produce coolers, that the temperature and humidity are maintained at a constant level, day-in and day-out, with normal fluctuations in the outside air temperatures. For example heat exchanger 100 was installed for a typical egg cooler and the temperature and relative humidity were monitored over a four day period. The ambient outside temperature ranged from 85° to 95° F. during the days whereas the temperature inside the egg cooler was maintained at approximately 40° during said four days running with the relative humidity remaining constant at also approximately 40%. Graphs demonstrate virtually no fluctuation in the temperature and relative humidity of the egg cooler once the temperature dropped to its desired 40° F. level.

Similarly, the constant temperatures and relative humidities have been proved in mobile homes, office buildings and the like and such tests demonstrate the uniformity of temperature and relative humidity which can be accomplished by use of exchanger 100 as shown in FIG. 5.

While various embodiments of the invention have been specifically shown and described, this was for purposes of illustration only, and not for purposes of limitation, the scope of the invention being in accordance with the hereinafter presented claims.

I claim:

1. In a heat pump heating and/or cooling system containing freon-type fluid, said system including above-ground components and an earth-type heat exchanger unit disposed during use of said system entirely below ground level, the improvement comprising:
    said unit including a generally cylindrical coil assembly having a plurality of generally cylindrical fluid-conducting coils extending in substantially concentric relationship to each other about the central axis of said assembly, each of said coils being formed of heat conductive and corrosion resistant tubing the tubing of each coil being of different diameter than the tubing of each other coil;
    and conduit means interconnecting said coil assembly and said above-ground system components for, during operation of said system, conducting said fluid to and from said fluid-conducting coils of said assembly.

2. A system as in claim 1, wherein said coils of said assembly are radially spaced from each other, and the adjacent convolutions of each of said coils are spaced from each other.

3. A system as in claim 1, wherein said coils include an outermost coil and an innermost coil, said tubing forming said outermost coil having a diameter greater than the diameter of said tubing forming said innermost coil.

4. A system as in claim 3, wherein said coils further include a coil intermediate said innermost and said outermost coils, said tubing forming said intermediate coil having a diameter greater than that of said tubing forming said innermost coil and less than that of said tubing forming said outermost coil.

5. In a heat pump system employing freon-type fluid for heating and/or cooling a mobile home and having above-ground system components carried by said mobile home, the improvement comprising:
    a readily installable, removable and transportable earth-type heat exchanger unit functionable as a fluid condenser during heating operation of said system and as a fluid evaporator during heating operation of said system;
    said unit being located during system operation entirely below ground level in heat exchange relationship with the thereto adjacent earth, and being of compact size and generally cylindrical shape said unit having a plurality of generally cylindrical fluid-conducting coils extending in substantially concentric relationship to each other about the central axis of said unit, each of said coils being formed of tubing, the tubing of each coil being of different diameter than the tubing of each other coil;

conduit means communicating with and extending from said unit for, during operation of said system, conducting said fluid to and from said unit;

releasable fluid-retentive coupling means for, during use of said system, releasably interconnecting said conduit means and said above-ground system components, and for retaining said fluid within said above-ground system components, said conduit means and said unit when said coupling means is released to permit movement of said mobile home and said system to another location.

6. A system as in claim 5, and further including elongate rigid means fixedly connected to and extending from said unit for permitting said unit to be controllably lowered to and raised from its below-ground location by a person at ground level grasping said rigid means.

7. A system as in claim 5, wherein each of said coils is formed of heat conductive and corrosion-resistant tubing.

* * * * *